United States Patent
Vinatzer

[11] 3,984,185
[45] Oct. 5, 1976

[54] PROCESS AND APPARATUS FOR FILTER VALUE AND EXPOSURE TIME DETERMINATION IN PHOTOGRAPHIC COLOR PRINTING AND ENLARGING

[75] Inventor: Alex Vinatzer, Brixen, Italy

[73] Assignee: Durst AG Fabrik Fototechnischer Apparate Bozen, Bolzano-Bozen, Italy

[22] Filed: Aug. 19, 1974

[21] Appl. No.: 498,750

[52] U.S. Cl. ............................ 355/38; 250/226; 355/68; 355/77; 355/83; 356/175
[51] Int. Cl.² ..................................... G03B 27/78
[58] Field of Search ............... 355/38, 68, 83, 77; 356/175; 250/226

[56] References Cited
UNITED STATES PATENTS

| | | | |
|---|---|---|---|
| 3,672,768 | 6/1972 | Schaub et al. | 355/38 |
| 3,724,954 | 4/1973 | Dreyfoos, Jr. | 355/38 X |

*Primary Examiner*—Richard A. Wintercorn
*Attorney, Agent, or Firm*—Connolly and Hutz

[57] ABSTRACT

Three measuring channels in a photographic color printing and enlarging apparatus are utilized for determining the filter values of the primary colors. The exposure time is determined by adjusting and reading the amplification factor of an amplifier which amplifies the signal of a light-voltage transducer containing a photoelectric element, which obtains its input from a measurement of each of the three primary color components in the printing light. The light-sensitive element of the photoelectric element has a characteristic curve which is linearly related to the intensity of illumination and it is preferably a photodiode. The light impinging on the photodiode is modulated by an electromechanical light-chopping device and the measuring signal is controlled by a zero-regulator. The light-sensitive element, the zero-regulated device, the light-chopping device and filter controlling device are miniaturized and fitted into a light-measuring probe. The light-measuring probe is equipped with inclination setting feet and an inclination determining device.

28 Claims, 4 Drawing Figures

PROCESS AND APPARATUS FOR FILTER VALUE AND EXPOSURE TIME DETERMINATION IN PHOTOGRAPHIC COLOR PRINTING AND ENLARGING

BACKGROUND OF THE INVENTION

The invention relates to a process and an apparatus for the filter value and exposure time determination, which is employed in connection with color enlarging apparatus.

In most of the known apparatus employed in color copying work, the technically measurable entity to be determined is the color of the ultimately exposed color paper as a result of the superimposition of the densities in each of the three color layers. Determination of the fileter values adjustably inserted in the enlarging apparatus and exposure time are accomplished by a measurement in the copying plane of the enlarger with a turned-on light source of the intensity of illumination in the individual color components to which the particular color layers of the color paper are sensitive, as well as by the determination of the exposure duration which is necessary in the copying process for the achievement of these densities.

For measuring the intensity of illumination, the output voltage of a light-voltage transducer is compared for each individual color of the three primary color constituents with the help of a zero indicator having a variable voltage source. The value measured is read at the positions of balancing potentiometers which pertain to the individual color components.

In the known apparatus, a total of four measuring channels are present. Three of these measuring channels serve for the evaluation of the individual basic color constituents, wherein in the measuring process, color filters corresponding to these basic colors are inserted into the path of rays of the measuring light, while the fourth channel serves for the determination of the exposure time required in the copying procedure, the respective intensity of illumination being measured by a filter adapted to the spectral properties of the color printing paper. In measuring the exposure time, the amplifying factor of the test amplifier remains constant, while the amplifying factor in the measuring of the individual color components is variable and in its value is unknown. This brings about the considerable disadvantage that the application of such apparatus is limited because the measured values of the color components agree only in relationship to each other and therefore do not allow an absolute determination of the necessary filter values. This disadvantage is contributed to because photomultipliers are used as the light-voltage transducers, and the amplification of photomultipliers must continuously be adapted to the various light conditons in order that the measuring range necessary for practical use may be obtained. These photomultipliers are not linear in their characteristic curve and have the further properties, which are very disadvantageous for use in measuring instruments, of being sensitive to outside light sources, require protection from vibration and, in addition, require very high supply voltages.

As a further disadvantage of the known apparatus, it has been shown that they require constant attention during operation in order that errors may be balanced out which occur in the receiver and in the measuring circuit due to temperature and to aging. In the servicing of these apparatus, it is also disadvantageous that for the null reading in the balancing procedure and the exposure reading, measuring instruments are employed, which very easily lead to reading errors due to parallax, because operator is constantly situated in different positions relative to the measuring instrument in the various adjusting operations on the enlarger, the equalizing procedure additionally being made more difficult by the swinging of the indicator. Also, the reading of the exposure time takes place by means of the same measuring instrument with the help of a logarithmic scale, which reproduces only a part of the exposure time range needed in practice sufficiently well and, in addition, does not allow an exact evaluation of intermediate values.

The object of the invention is to develop an apparatus for the filter and exposure time determination which does not have the stated disadvantages, wherein the measuring values of the color components are not only determined in relationship to each other but wherein a measurement of the absolute values is possible; furthermore, wherein no further calibration is necessary and an exposure time determination corresponding to the spectral properties of the photographic color printing paper is possible without a special measuring channel being required with its own filter, equalizing potentiometer and indicating instrument for the indication of the exposure time.

SUMMARY

The object is solved by a process, which is characterized in that the determination of the exposure time takes place by means of each of the measuring channels serving for the determination of the filter values by adjusting and reading the amplification factor of an amplifier provided for the amplification of the signal of a light-voltage transducer containing a phot-electric element.

The invention also encompasses an apparatus suitable for the execution of this process, which contains as the photoelectric element a light-sensitive element with a characteristic curve linearly relating to the intensity of illumination, preferably a photodiode, the light falling thereon being modulated by a preferably electromechanical light-chopping device and the measuring signal being controlled by a zero-point regulator in such a manner that otherwise checking the apparatus during operation is not necessary.

The novel apparatus furthermore contains an electromechanical filter-control device, which is particularly simply and inexpensively manufactured.

In an advantageous design of the novel apparatus, the zero reading for the balancing procedure occurs by means of an illuminated band indicating unit.

In addition, it has been shown to be advantageous to use potentiometers with digital indicators for the values to be read, such potentiometers especially facilitating reading of the measured results and improving the duplicating accuracy of the apparatus.

In a further development of the invention, the light-sensitive element and the zero-point regulating device are incorporated in a measuring probe; the light chopping device and the filter control device may be miniaturized to such an extent that they may similarly be fitted into the measuring probe.

In order to have assured the light incidence also on a small effective surface of the light-sensitive element in measurements at various places of the projection plane of an enlarger, i.e. with respect to various light incidence directions, even when the light-sensitive element is not directly arranged under to light incidence aperture of such a measuring probe, a suitable setting mechanism is provided by means of which a certain inclination of the probe compared with the projection plane may be established. In this connection, a special auxiliary device is provided for determining the correct inclination.

Advantageous further embodiments of the subject matter of the invention are described in the subclaims.

BRIEF DESCRIPTION OF THE DRAWINGS

Novel features and advantages of the present invention will become apparent to one skilled in the art from a reading of the following description in conjunction with the accompanying drawings wherein similar reference characters refer to similar parts and in which.

DESCRIPTION OF THE PREFERRED EMBODIMENTS

Figure 1:
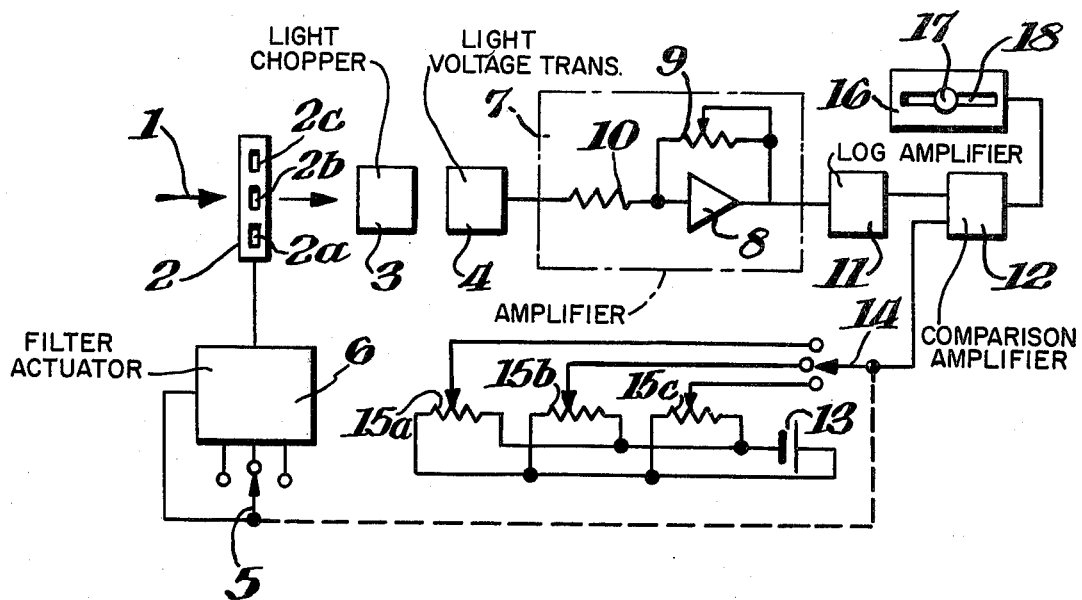
FIG. 1 is a schematic diagram of a novel measuring arrangement which is one embodiment of this invention.

The measuring light beam 1 shown in FIG. 1, penetrating one of the color filters 2a or 2b or 2c corresponding to each of the color photosensitive layers of the photosensitive color paper and situated on filter bracket 2, is modulated by a light chopping device 3 and impinges on a light-voltage transducer 4, which contains preferably a linear light-sensitive element, e.g. a photodiode, as well as a zero-point regulating device of the type described in commonly assigned German Pat. application (D.O.S.) No. 2,331,191 and corresponding U.S. Pat. application Ser. No. 373,391, filed June 25, 1973, and British Pat. application No. 30052/73 of June 25, 1973.

The individual filters 2a, 2b, 2c are inserted into the path of rays of the measuring light 1, depending on the color component which is desired to be measured, upon the activation of the selector switch 5 by means of a respective control logic and filter-activating device 6. Further particulars of the filter-control device are discussed later.

The signal resulting in the light-voltage transducer 4, which is linearly dependent on the intensity of illumination of the measuring light, is amplified in an amplifier 7 whose amplification factor may be regulated by changing the resistance relationships between potentiometer 9, contained in the negative feedback circuit of an operational amplifier 8, and a resistor 10, provided at the input of the operational amplifier 8. The output signal of amplifier 7 is logarithmated by logarithmic amplifier 11, and in comparison amplifier 12 is compared with the signal which is picked up by a potentiometer 15a, or 15b or 15c, which is supplied by a power source 13 and is connected by means of a selector switch 14 with comparison amplifier 12. Selector switch 14 is mechanically coupled with selector switch 5, so that a corresponding potentiometer 15a, 15b, 15c is provided for each filter 2a, 2b, 2c.

The output signal of the comparison amplifier 12 is made visible by an illuminated band zero-indicating unit 16 in such a manner that with a uniformity of the signals at the input of the comparison amplifier 12, a zero lamp 17 is illuminated, whereas according to a positive or negative difference of the compared signals, illuminated bands 18 light up at the left or the right side of zero lamp 17 in a length corresponding to the degree of the difference between the two comparison signals. Illuminated bands 18 may be formed, for example, by respectively aligned incandescent lamps or light-emitting diodes.

The following prior patents and publications may be utilized for the equipment represented in the indicated schematic blocks.

Block 3: "Light chopper"

In U.S. Pat. application Ser. No. 373,391 (now U.S. Pat. No. 3,892,493) a light chopper (there, indicated as "shutter device") 16 (FIG. 1) or 25 (FIG. 2) is mentioned, by means of which a photoelectric diode 1 is exposed to the measuring light and screened thereby, in an intermittent manner. The corresponding application in Germany (German Pat. No. 2,331,191) was published in Jan. 31, 1974. Light choppers in photoelectric meters were generally known even before this point in time. (For example, U.S. Pat. No. 3,684,378 - Lord).

Block 4: "Light-Voltage-Transformer"

A trade publication of UNITED DETECTOR TECHNOLOGY INC., Santa Monica, Cal. 90404, in the year 1972, contains at page 10 a light voltage transformer (FIGS. 14, 15, 16, 17), showing as the input signal, the light falling on the photoelectric diode, and as the output signal, the voltage $e_o$. In such a circuit arrangement, the photoelectric diode is used as the current source, for which reason, in this connection, each voltage transformer with an attached photoelectric diode at its input may be considered a light-voltage-transformer. Also pertinent is a circuit shown in CURRENT TO VOLTAGE, published at page 429, GUIDEBOOK OF ELECTRONIC CIRCUITS, by McGraw-Hill, 1974, by the author John Markus, which was developed for photoelectric detectors (first published in August, 1971, and in particular in trade publication of ANALOG DEVICES INC, Norwood, Ma.). U.S. Pat. No. 2,892,493 also discloses a light-voltage transformer containing the photoelectric diode 1 and amplifier 4.

Block 7: "Amplifier and Operational Amplifier 8"

Operational amplifiers have been generally known and used for many years, as clearly shown by the patents mentioned for block 4. Reference is also made to a prospectus of the company TELEDYNE SEMICONDUCTOR, Mountain View, Cal. 94040, which was published in February, 1973 and which contains all data required by one skilled in the art for utilizing such a unit. Such an amplifier need not be developed anew; rather, it may be obtained in integrated form from most semiconductor manufacturers. Further refeence is made to a prospectus of an operational amplifier of the company TELEDYNE PHILBRICK, Dedham, Ma. 02026, dated 1971, which shows that operational amplifiers are generally used for the perfecting of signals of photoelectric diodes.

Block 11: "Logarithmic Amplifier"

Logarithmic modules are equally obtainable for a long time as integrated chips. See prospectus of the company TELEDYNE PHILBRICK NEXUS, dated 1970, which also container a technical application pertaining to light. These chips require the connection to normal operational amplifiers in order to produce a logarithmic amplifier as shown by the description. There is no difficulty at all to overcome for one skilled in the art to use such a logarithmic amplifier. Also known are fully integrated logarithmic amplifiers as shown by the prospectus of the company ILC DATA DEVICE CORP., Bohemica, L.I., N.Y. 11716. Further references to logarithmic amplifiers are also contained in the already mentioned GUIDEBOOK at pages 406, 407 and 574. In the sources given there, the circuits have been published in the years 1970 and 1971.

Block 12: "Comparison Amplifier"

Comparison circuits are easily realized with the help of operational amplifiers in that one of the voltages to be compared is conducted to its noninverted input and the second voltage, to be compared with the first, is conducted to its inverted input. Circuit examples again are given in the GUIDEBOOK and in particular at pages 140 and 575. Page 140 shows an "IC Voltage Comparator", which was published in 1970; at page 575, a "Subtracting Amplifier, " published in 1972. From this latter circuit it is clear that the output voltage $e_o = n(e_2-e_1)$, which represents the difference of the input voltages $e_2$ and $e_1$ to be used, which is multiplied with the amplification factor $n$. For one skilled in the art, it is therefore entirely clear how the function described at pages 7 and 8 of this application text may be realized.

Block 16: "Zero Indicating Unit"

Any zero voltage indicator could be used, e.g. a zero voltmeter also, However, it is also known to realize an indication wherein a luminous band composed of a series of lamps is employed in place of an indicator. A luminous band measuring voltage indication is described in DT-AS 2,141,361 (published Feb. 22, 1973).

This published application points out the previously known U.S. Pat. No. 3,039,013 (issured June 12, 1962), which also discloses an illuminated band indicator. To use an indicator such as the zero voltage indicator should certainly be within the capability of one skilled in the art. Circuits for illuminated band indicators may also be obtained as integrated chips, e.g. from the compant TEXAS INSTRUMENTS. As set forth a German-language prospectus on the above from 1975 (in this connection, illustrations 7, 8, 9 are of interest).

Block 16: "Actuator"

Figure 3:
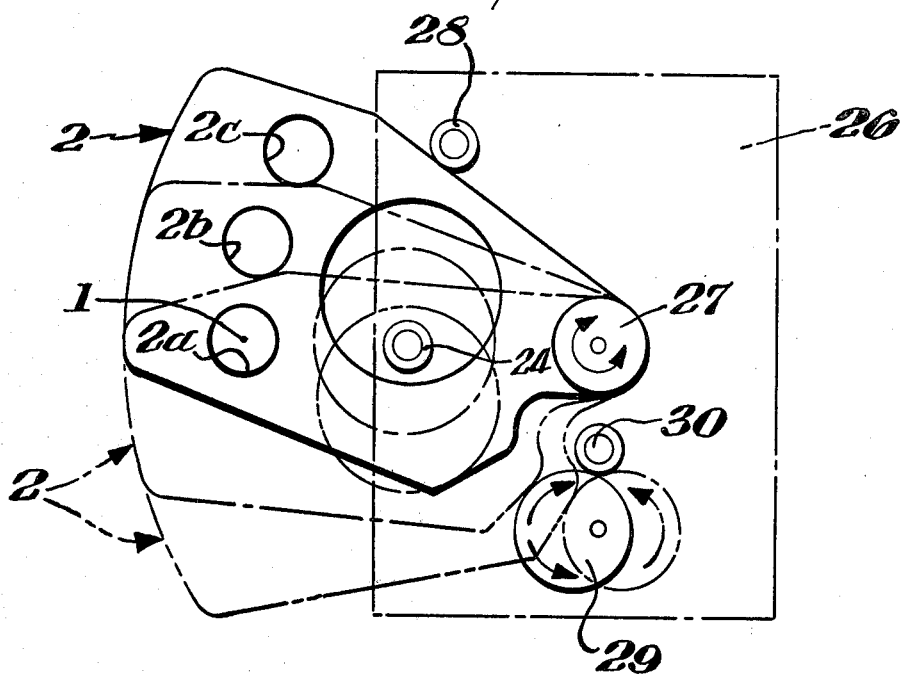
FIG. 3 is a schematic illustration of a filter bracket and corresponding filter activating device for use in conjunction with the embodiment shown in FIG. 1.

The function is illustrated in FIG. 3 and described in detail herein.

For the measuring procedure, the mechanically coupled selector switches 5 and 14 are brought into the position corresponding to the color component to be measured.

Potentiometer 15a, 15b, or 15c, corresponding to the selected color, is set in such a manner until the input signals of the comparison amplifier 12 are equal, this comparison procedure being controlled by means of the zero-indicator unit 16. The setting indicated on the illumination of zero lamp 17 of the particular potentiometer 15a, 15b, or 15c corresponds to the intensity of illumination of the measuring light beam 1 penetrating the particular color filter 2a, 2b or 2c.

Since the light-voltage transducer 4 is linear in comparison to the intensity of illumination and the output signal of amplifier 7 is logarithmated in the logarithmic amplifier 11, the indication of potentiometers 15a, 15b, 15c may be calibrated immediately in density units, which correspond to the units given on the filter scales of the colorlight heads of enlarging apparatus.

From the setting of the potentiometer 9 serving for changing the amplification factor of amplifier 7, the direct indication of the exposure time necessary for the copying process may be determined within the limits that the reciprocity law can be applied.

The relationship between amplification factor of the measuring amplifier 7 and exposure time, made possible by the described arrangement, is explained in more detail below:

In the density equation $$D = \log Et,$$

wherein $D$ is the density of the particular layer of the color paper, $E$ is the effective intensity of illumination, and $t$ is the exposure time, E is substituted by the linear reference $$E = \frac{U_E}{K}$$

resulting from the described arrangement, wherein $U_E$ is the output signal of the measuring amplifier 7 and $K$ is the amplification factor of this amplifier.

The density equation may also have the following form $$D = \log U_E \frac{t}{K},$$

from which it may be seen that density $D$ remains uninfluenced when the amplification factor $K$, changed in the determination of the filter density, is taken into consideration in the copying process by a corresponding change of exposure time.

In practice, a final measurement with the apparatus of this invention can be made only after it is balanced, which consists of first producing, in a series of tests, an ideal color picture from a negative in accordance with the color evaluation of the photograph. Thereupon, the filter values used for the preparation of the ideal copy are read from the scales of the graduated control knobs of the color mixing head and transmitted to the scales of potentiometers 15a, 15b, 15c of the filter-determining apparatus; the resistance value of the individual potentiometers forming the reference value for the individual color values in the later measurements. The exposure time determined in the production of the ideal copy is set at potentiometer 9 of the measuring amplifier. Thus the apparatus is adjusted and is prepared for measurements of further negatives or transparencies.

In the measuring process, the measuring probe, with a particular negative or transparency inserted into the aperture of an enlarging apparatus, is placed on a spot of the projection surface of the enlarging apparatus on which the same color is to be achieved which was obtained at an equivalent spot of the calibration picture — e.g. the skin color tone in a series of portrait exposures. The measurement occurs in such a manner that the individual color filters 2a, 2b, 2c are moved in sequence in front of the measuring light receivers by the activation of switch 5. For each basic color, the color filter in the color mixing head, corresponding to filters 2a, 2b, 2c, is adjusted until zero lamp 17 is illuminated in indicator 16. If this balance is possible for all three basic colors, the exposure times remain the same as set previously at potentiometer 9. However, it may also occur that the light relationships have changed in comparison to the test copy (e.g. by the alteration of the scale of enlargement) in such a manner that the balancing of one or several filter colors by the insertion of the filters becomes no longer possible, i.e. that the light beam 18 cannot be moved up to the zero point on indicator 16 and the zero lamp does not light up. In this instance, the balancing must be achieved by changing the amplification factor of amplifier 7, hence by adjusting potentiometer 9. By the interrelationships previously mentioned, the change in amplification factor corresponds to a change in the exposure time, whose value may be read from the new setting of potentiometer 9.

In a specific embodiment, which deviates from that just described, there may be arranged in the negative feedback circuit of the operational amplifier 8, in place of potentiometer 9, a certain number of resistors whose values are different from each other and are graduated accordingly. These resistors being connected by means of a suitable selector switch with the input or output of the operational amplifier 8 and thus a gradually variable exposure time, pertaining to the particular resistance value, is set and indicated.

In addition, in the negative feedback circuit of operational amplifier 8, there may be provided corresponding circuit elements with non-linear characteristic curves in such a manner that on the setting and reading the exposure time, the failure of the reciprocity law (in German: "Schwarzschild Effect") is also taken into consideration. Potentiometers 9, 15a, 15b, 15c may receive a digital indication of their position, so that the numerical values read may be transferred in a convenient manner directly to an exposure control device or to the filter scales of a copying apparatus.

Figure 2:
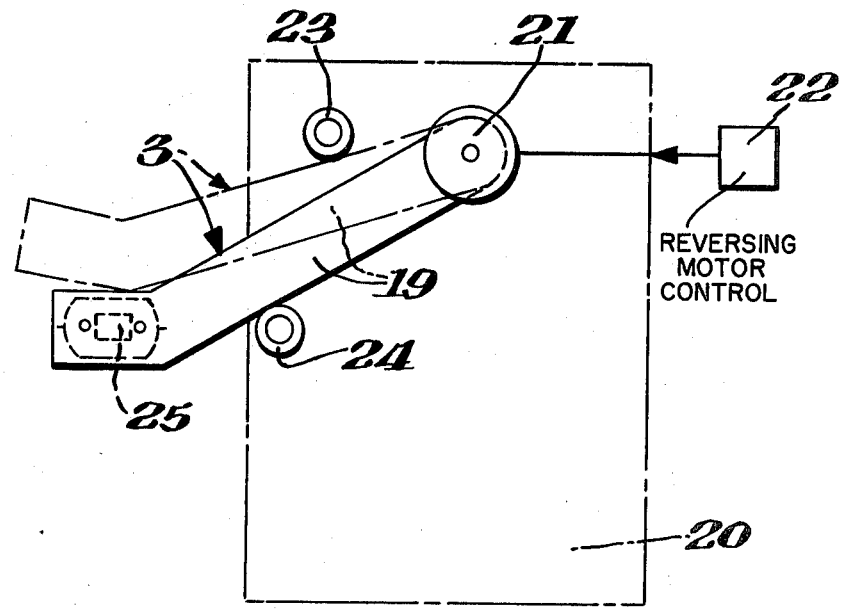
FIG. 2 is a schematic illustration of a light chopping device for use in conjunction with the diagram shown in FIG. 1.

The electromechanical light chopper 3, illustrated in FIG. 2, consists of a shutter lever 19, which is energized by an electrical motor 21, e.g. a DC motor, mounted on a base plate 20. With an apparatus ready for measuring, an alternating torque is imparted by motor 21 by means of the respective motor control device 22 in such a manner that shutter lever 19 is moved back and forth at a certain frequency between the positions determined by two stops 23 and 24 and thus alternately covers and then exposes the photoelectric element 25 of light-voltage transducer 4, so that the measuring light beam 1 (FIG. 1) falling thereon is modulated by the movement of shutter lever 19.

The insertion of the individual color fitlers 2a, 2b, 2c into the path of beam of measuring light 1 takes place with the help of an electric motor 27, e.g. a DC motor, mounted on a base plate 26 (FIG. 3), which drives filter bracket 2 and moves it into the positions limited either by stop 28 or on the other side by cam 29. Cam 29 in turn is moved by a further (unillustrated) electric motor into one of the two possible positions, which are determined by a stop 30.

Motor 27 and the eccentric drive motor are imparted such a torque by means of a suitable control logic that a color filter 2a, 2b, or 2c corresponding to the color set at the selector switch 5 is inserted into the path of beam of measuring light 1. The three possible positions of the filter bracket are illustrated in FIG. 3, the direction of torque exerted by the motors being made visible by respective directional arrows.

The light chopper (FIG. 2) and the filter-activating device (FIG. 3) may be mounted on a single base plate, wherein stop 28 for filter carrier 2 may serve at the same time as one of the stops (stop 23) for the shutter lever 19 of the light chopper.

The light chopper and the filter-activating device may be miniaturized to such an extent that they may be incorporated together with the photoelectric element 25 in the measuring probe. In order that measuring light beam 1, even with a certain structural height of such a probe (FIG. 4), may always fall on the light-sensitive surface of the photoelectric element 25 independent of the light incidence angle, there is provided an adjusting device by means of which probe 31 may be brought into the correct position to the measuring light beam 1. For an easier determination of this position, in probe 31, there is provided a preferably transparent plate 32 with a circular beveled aperture 33, which upon the insertion of the probe 31 into the path of beam of measuring light 1 throws a corresponding annular shadow on plate 34 having a light-passing aperture 35. For the purpose of measuring probe 31 is inclined in such a way that the annular shadow thrown from beveled aperture 33 on plate 34 is concentric with the light-transmitting aperture 35. A centering circle 36 is mounted on the plate 34 concentrically with the light-transmitting aperture 35. The diameter of the centering circle is somewhat different from the diameter of the image of aperture 33 projected on the same plate 34; and the centering circle is provided as a centering aid.

Figure 4:
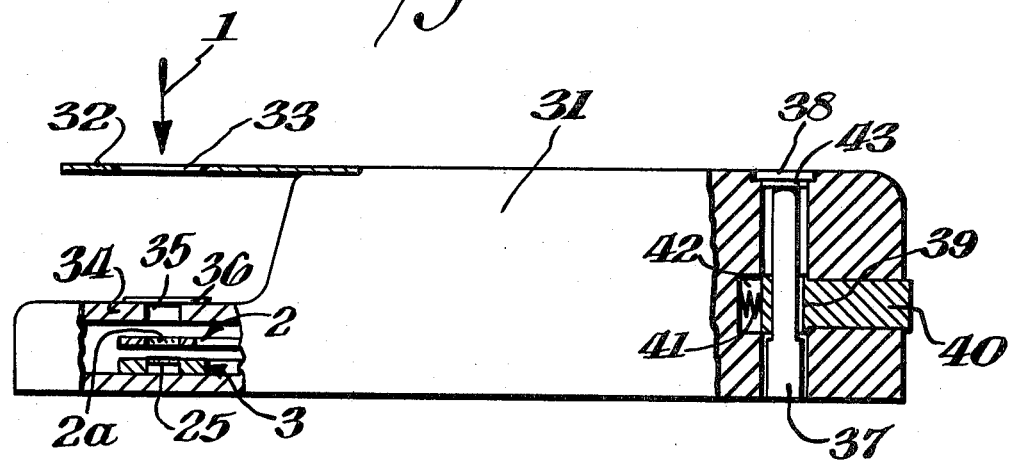
FIG. 4 is a schematic illustration of a measuring probe (partially in cross-section) for use in conjunction with the embodiment shown in FIG. 1, and incorporting some of components shown in FIGS. 1–3.

The inclination resulting in the above-described manner may be fixed in a position by means of one of the two legs 37 mounted laterally on probe 31, one of which is cross-sectionally illustrated in FIG. 4. Leg 37 is arranged movably in a bore 38 and in a bore 39, coaxial to the bore 38. Bore 39 is situated in a holding device 40, perpendicularly arranged in the direction of movement of foot 37, which in turn may be moved opposite the effective direction of spring 41 in a bore 42. By means of the holding device with the aid of spring 41 such a force may be exercised on foot 37 that it may be made stationary in any desired position within bore 38. The movement of foot 37 occurs by the force of gravity with pressure on the holding device 40 opposing the force of spring 41. With an inclined immobilization of probe 31, the movement of foot 37 is freed by the corresponding activation of the holding device 40, said lever always remaining in contact with the contact surface. When the correct inclination of the probe is achieved, the holding device 40 is released and thus the correct position of probe 31 is fixed.

In order to prevent foot 37 from slipping out of bore 39, the upper end of said foot has a head 43 whose diameter is larger than the diameter of bore 39 in holding device 40.

I claim:

1. A process for determining filter values and exposure time for a photographic color printing apparatus which interposes filters in the printing light, has three measuring channels for determining the filter values for each of the primary colors and includes an amplifier connected to a light-voltage transducer having a photoelectric element, comprising the steps of interposing filters in the printing light for determining the filter values for each of the primary colors, adjusting and reading the amplification factor of the amplifier while the filter values are being determined to provide a signal, and using the signal to quantitatively determine the duration of the exposures to the light for the printing process utilizing the determined filter values.

2. A process as set forth in claim 1 wherein an output is obtained from a light-voltage transducer which is substantially linearly related to the intensity of illumination whereby the filter values are quantitatively determined.

3. An apparatus for determining filter values and exposure time for a photographic color printing apparatus having three measuring channels for determining the filter values for each of the primary colors comprising a lightvoltage amplifier connected to a light-voltage transducer which includes a photoelectric element, light input means connected with the photoelectric element for providing a light input corresponding to the light of each of the primary colors being utilized in the exposures, adjusting and reading means on the light-voltage amplifier for setting and reading the amplification factor of the light-voltage amplifier to provide a signal which is a measure of the exposure time, comparison means for utilizing the signal to quantitatively determine the filter values and the comparison means including filter value indicating means for displaying the filter value related to the exposure time determined by the adjusting and reading means.

4. An apparatus as set forth in claim 3 wherein the light-voltage transducer has a characteristic which is substantially linearly related to the intensity of illumination.

5. An apparatus as set forth in claim 4 wherein the light-voltage transducer contains a photodiode as the photoelectric element.

6. An apparatus as set forth in claim 3 wherein the light impinging on the light-voltage transducer is modulated by a light chopper.

7. An apparatus as set forth in claim 3 wherein the light-voltage transducer has an automatic zero-point control.

8. An apparatus as set forth in claim 3 wherein an operational amplifier is provided as the light-voltage amplifier, the operational amplifier having a negative feedback circuit, a potentiometer being connected in the negative feedback circuit, and means for reading the amplification factor being disposed at the potentiometer.

9. An apparatus as set forth in claim 8 wherein a selector switch is connected to the light-voltage amplifier for adjusting the amplification factor, the selector switch being constructed and arranged to provide an indication of its selected position, a number of resistors having graduated resistance values being connected in the negative feedback circuit of the operational amplifier, and the selector switch being connected to the number of resistors for selectively connecting them into the negative feedback circuit of the operational amplifier.

10. An apparatus as set forth in claim 9 wherein the indicating device for the setting of the potentiometer and the selector switch are calibrated in time units.

11. An apparatus as set forth in claim 8 wherein switching elements having a non-linear characteristic are provided in the negative feedback circuit of the operational amplifier in such a manner that in the setting and reading of the exposure time, failure of the reciprocity law is taken into consideration.

12. An apparatus as set forth in claim 3 wherein a logarithmic amplifier is provided for logarithmating the output signal of the amplifier provided for the amplification of the signal of the light-voltage transducer.

13. An apparatus as set forth in claim 3 wherein a comparison amplifier is provided, an illuminated band zero indicator unit is employed for the indication of the output signal of the comparison amplifier, a zero indicating lamp is connected to the comparison amplifier and constructed and arranged to be illuminated when the signals entering the comparison amplifier are uniform, illuminated bands on the left and right of the zero indicating lamp which corresponding to a positive or a negative difference of the compared signals the illuminated bands light up at the left or the right side of the zero indicating lamp in a length corresponding to the extent of the difference of the compared signals.

14. An apparatus as set forth in claim 13 wherein the illuminated bands comprise aligned lamps.

15. An apparatus as set forth in claim 14 wherein the aligned lamps are incandescent lamps.

16. An apparatus as set forth in claim 14 wherein the aligned lamps are light emitting diodes.

17. An apparatus as set forth in claim 5 wherein the light chopper comprises a shutter lever actuated by an electric motor, an alternating torque imposing motor control device being connected to the motor whereby the shutter lever is alternately situated in one of the positions limited by two stops and in an alternating sequence covers and uncovers the photoelectric element.

18. An apparatus as set forth in claim 3 wherein in the measuring light path of rays before the photoelectric element there are arranged color filters which are mounted on a filter bracket, a control logic and filter-activating device connected to the filters, and electric motor connected to the control logic and filter-activating device for moving it into one of two positions, one position being limited by a stop and the other by a cam, the cam being brought into one of two cam positions determined by a stop by means of a further electric motor controlled by the same control logic.

19. An apparatus as set forth in claim 18 wherein the light chopper and the filter bracket with the color filters are incorporated together with the photoelectric element in a measuring probe.

20. An apparatus as set forth in claim 19 wherein the measuring probe has a housing and is inclinable and the incline may be fixed by means of movable feet movably connected to the housing of the measuring probe, the feet being lockable by means of a holding device in a desired position.

21. An apparatus as set forth in claim 20 wherein a transparent plate and underlying plate are mounted on the measuring probe, a circular beveled aperture in the transparent plate which upon insertion of the measuring probe into the measuring path of rays throws a circular shadow on the underlying plate, an aperture in the underlying plate for the passage of light under which is disposed the photoelectric element.

22. An apparatus as set forth in claim 21 wherein the underlying plate on which the aperture for the passage of light is situated has mounted concentric thereto a centering circle, whose diameter is somewhat different from the diameter of the annular shadow falling on the underlying plate.

23. An apparatus as set forth in claim 3 wherein potentiometers pertaining to the individual color components are provided for the three channels, indicating devices being provided on the potentiometer for indicating their settings and the indicating devices are calibrated in density units.

24. An apparatus as set forth in claim 23 wherein the potentiometers have a digital indicating device for indicating their settings.

25. An apparatus as set forth in claim 10 wherein the potentiometer has a digital indicating device for indicating its setting.

26. A process as set forth in claim 1 wherein:
a. a color filter, which corresponds to one of the three primary colors, is inserted into the measuring light beam to be measured before a photoelectric transformer;
b. the amplfication factor of an amplifier amplifying the signal of the photoelectric transformer is set and read, the value read corresponds to the exposure time required for the copying process;
c. the output signal of the amplifier is compared with the signal corresponding to a filter value in the primary color viewed, which may be varied by adjusting means, whose setting is indicated and coordinated with the filter values;
d. the signal corresponding to the filter values is altered by means of the adjusting means in such a manner that it corresponds to the output signal of the amplifier;
e. the filter value is read on the adjusting means;
f. the steps (a), (c), (d), (e), are carried out for another primary color;
g. steps (a), (c), (d), (e), are carried out for the third primary color;
In steps (f) and (g) the amplification factor remains unchanged.

27. A process as set forth in claim 26 wherein the amplification factor is readjusted to accommodate all of the required filter values.

28. A process as set forth in claim 1 wherein a standard color print is produced by a color printing apparatus having a color mixing head with calibrated control knobs by the process set forth in claim 1 in which an exposure time is determined, the filter values utilized in producing the standard color print being registered, the registered filter values being utilized for setting the calibrated color knobs of the color mixing head, and further color prints being made from further transparencies at the exposure time determined when the standard color print was produced.

* * * * *